United States Patent
Saito et al.

(10) Patent No.: US 9,944,787 B2
(45) Date of Patent: Apr. 17, 2018

(54) RESIN COMPOSITION, PREPREG AND LAMINATE

(71) Applicant: MITSUBISHI GAS CHEMICAL COMPANY, INC., Tokyo (JP)

(72) Inventors: Chisato Saito, Tokyo (JP); Daisuke Ueyama, Tokyo (JP); Masanobu Sogame, Tokyo (JP); Yoshinori Mabuchi, Tokyo (JP); Yoshihiro Kato, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 580 days.

(21) Appl. No.: 14/388,516

(22) PCT Filed: Mar. 25, 2013

(86) PCT No.: PCT/JP2013/058625
§ 371 (c)(1),
(2) Date: Sep. 26, 2014

(87) PCT Pub. No.: WO2013/146700
PCT Pub. Date: Oct. 3, 2013

(65) Prior Publication Data
US 2015/0050472 A1 Feb. 19, 2015

(30) Foreign Application Priority Data
Mar. 30, 2012 (JP) ................. 2012-080722

(51) Int. Cl.
| | | |
|---|---|---|
| *C08L 63/00* | (2006.01) | |
| *B32B 15/08* | (2006.01) | |
| *B32B 15/092* | (2006.01) | |
| *C08J 5/24* | (2006.01) | |
| *B32B 15/14* | (2006.01) | |
| *C08L 71/00* | (2006.01) | |
| *C08K 3/22* | (2006.01) | |
| *C08L 3/10* | (2006.01) | |
| *C08L 79/04* | (2006.01) | |

(52) U.S. Cl.
CPC .............. *C08L 63/00* (2013.01); *B32B 15/08* (2013.01); *B32B 15/092* (2013.01); *B32B 15/14* (2013.01); *C08J 5/24* (2013.01); *C08K 3/22* (2013.01); *C08L 3/10* (2013.01); *C08L 71/00* (2013.01); *C08L 79/04* (2013.01); *B32B 2305/076* (2013.01); *B32B 2457/08* (2013.01); *C08J 2363/00* (2013.01); *C08K 2003/221* (2013.01); *C08K 2003/2224* (2013.01); *C08L 2201/08* (2013.01); *C08L 2203/20* (2013.01); *Y10T 428/24893* (2015.01); *Y10T 442/2475* (2015.04); *Y10T 442/3455* (2015.04); *Y10T 442/656* (2015.04)

(58) Field of Classification Search
CPC .... C08K 3/22; C08J 5/24; C08L 71/00; C08L 63/00
See application file for complete search history.

(56) References Cited

U.S. PATENT DOCUMENTS

| | | | |
|---|---|---|---|
| 7,056,585 B2 | 6/2006 | Mishima et al. | |
| 7,601,429 B2 * | 10/2009 | Kato | .......... B32B 15/08 428/447 |
| 9,232,648 B2 * | 1/2016 | Miyahira | .......... C01G 39/00 |
| 2004/0166324 A1 * | 8/2004 | Mishima | .......... C08J 5/10 428/413 |
| 2010/0048789 A1 | 2/2010 | Shieh et al. | |
| 2012/0077401 A1 | 3/2012 | Kotake et al. | |
| 2012/0100770 A1 | 4/2012 | Fung et al. | |
| 2012/0111621 A1 | 5/2012 | Ohigashi et al. | |
| 2012/0276392 A1 | 11/2012 | Takahashi et al. | |

FOREIGN PATENT DOCUMENTS

| | | | |
|---|---|---|---|
| CN | 102365310 | 2/2012 | |
| JP | 2001-348488 | 12/2001 | |
| JP | 2004-59643 | 2/2004 | |
| JP | 2007-138075 | 6/2007 | |
| JP | 2010-47743 | 3/2010 | |
| JP | 2010-248473 | 11/2010 | |
| JP | 2011-26419 | 2/2011 | |
| JP | 2011-157509 | 8/2011 | |
| WO | 2011/010672 | 1/2011 | |
| WO | 2011/078339 | 6/2011 | |
| WO | 2011/161902 | 12/2011 | |
| WO | WO 2013047203 A1 * | 4/2013 | .......... C01G 39/00 |

OTHER PUBLICATIONS

Search report from International Bureau of WIPO in PCT/JP2013/058625, dated Jun. 18, 2013.
International Preliminary Report on Patentability dated Oct. 1, 2014 in English in PCT/JP2013/058625.

* cited by examiner

*Primary Examiner* — Gerard Higgins
(74) *Attorney, Agent, or Firm* — Greenblum & Bernstein, P.L.C.

(57) ABSTRACT

The present invention provides a resin composition which can simply provide, with good reproducibility, a laminate, a printed wiring board, and the like that not only have excellent heat dissipation properties but have good moldability, good mechanical drillability and excellent appearance, and a prepreg, a metal foil-clad laminate, and the like using the same. A resin composition having a cyanate ester compound (A), an epoxy resin (B), a first inorganic filler (C), a second inorganic filler (D), and a molybdenum compound (E), wherein an average particle diameter ratio of the first inorganic filler (C) to the second inorganic filler (D) is in a range of 1:0.02 to 1:0.2.

22 Claims, No Drawings

RESIN COMPOSITION, PREPREG AND LAMINATE

TECHNICAL FIELD

The present invention relates to a resin composition, a prepreg, a laminate, and the like, and particularly to a resin composition for a printed wiring board that not only has excellent heat dissipation properties but has good moldability, good mechanical drillability and excellent appearance, and the like.

BACKGROUND ART

In recent years, higher integration, higher functionality, and higher density mounting of semiconductors, which are widely used in electronic equipment, communication instruments, personal computers, and the like, have been increasingly accelerated, and the demand for the properties of printed wiring boards has increased more than ever before. Particularly, heat dissipation techniques for printed wiring boards against the heat generation of semiconductors have been required. This is because with higher functionality of semiconductors, the amount of heat generated from the semiconductors has increased, and because configurations in which heat accumulates easily inside have been provided due to the influence of higher integration and higher density mounting.

Generally, thermosetting resins, such as epoxy resins, used for the insulating layers of printed wiring boards have low thermal conductivity in themselves. Therefore, in order to improve the thermal conductivity of printed wiring boards, a thermally conductive resin composition is proposed in which 80 to 95% by weight of a mixed filler (inorganic filler) having a predetermined particle diameter distribution is blended with a thermosetting resin to attain the thermal conductivity of the cured product to 3 to 10 W/mK (see Patent Literature 1).

CITATION LIST

Patent Literature

Patent Literature 1: Japanese Patent Laid-Open No. 2001-348488

SUMMARY OF INVENTION

Technical Problem

However, when a thermosetting resin composition is highly filled with an inorganic filler as in the above Patent Literature 1, the thermal conductivity can be improved, but the volume ratio of the thermosetting resin decreases. Therefore, the moldability deteriorates, and cracks and voids are likely to occur between the resin and the inorganic filler. In addition, a printed wiring board highly filled with an inorganic filler has the disadvantage of poor workability, and particularly has the problem of significant wear and breakage of a drill bit in hole working by a mechanical drill.

The present invention has been made in view of the above problems, and it is an object of the present invention to provide a resin composition which can simply provide, with good reproducibility, a laminate, a printed wiring board, and the like that not only have excellent heat dissipation properties but have good moldability, good mechanical drillability and excellent appearance. It is another object of the present invention to provide a prepreg, a laminate, a metal foil-clad laminate, a printed wiring board, and the like that have excellent heat dissipation properties, moldability, mechanical drillability, and glass transition temperature.

Solution to Problem

The present inventors have studied diligently for solving such problems, and, as a result, found that the above problems are solved by using a resin composition comprising a cyanate ester compound (A), an epoxy resin (B), a first inorganic filler (C), a second inorganic filler (D), and a molybdenum compound (E), wherein the average particle diameter ratio of the first inorganic filler (C) to the second inorganic filler (D) is in a range of 1:0.02 to 1:0.2, leading to the completion of the present invention.

Specifically, the present invention provides the following <1> to <23>.

<1> A resin composition comprising a cyanate ester compound (A), an epoxy resin (B), a first inorganic filler (C), a second inorganic filler (D), and a molybdenum compound (E), wherein an average particle diameter ratio of the first inorganic filler (C) to the second inorganic filler (D) is in a range of 1:0.02 to 1:0.2.

<2> The resin composition according to above <1>, wherein a mass ratio of the first inorganic filler (C) to the second inorganic filler (D) is in a range of 1:0.03 to 1:0.5.

<3> The resin composition according to above <1> or <2>, wherein the first inorganic filler (C) and the second inorganic filler (D) are comprised in an amount of 200 to 800 parts by mass in total based on 100 parts by mass of a total of the cyanate ester compound (A) and the epoxy resin (B).

<4> The resin composition according to any one of above <1> to <3>, wherein the molybdenum compound (E) is comprised in an amount of 0.1 to 20 parts by mass based on 100 parts by mass of the total of the cyanate ester compound (A) and the epoxy resin (B).

<5> The resin composition according to any one of above <1> to <4>, wherein the first inorganic filler (C) is magnesium oxide and/or boehmite.

<6> The resin composition according to any one of above <1> to <5>, wherein the first inorganic filler (C) has an average particle diameter of 0.5 to 10 μm.

<7> The resin composition according to any one of above <1> to <6>, wherein the second inorganic filler (D) is at least one selected from the group consisting of alumina, magnesium oxide, boron nitride, and aluminum nitride.

<8> The resin composition according to any one of above <1> to <7>, wherein the second inorganic filler (D) is spherical.

<9> The resin composition according to any one of above <1> to <8>, wherein the first inorganic filler (C), the second inorganic filler (D), and the molybdenum compound (E) are comprised in an amount of 40 to 70% by volume in total based on a total volume of the resin composition.

<10> The resin composition according to any one of above <1> to <9>, wherein the molybdenum compound (E) forms a core particle, and an inorganic oxide is formed on at least part of a surface of the core particle.

<11> The resin composition according to any one of above <1> to <10>, wherein the cyanate ester compound (A) is at least one selected from the group consisting of a naphthol aralkyl-based cyanate ester compound, a novolac-based cyanate ester compound, and a biphenyl aralkyl-based cyanate ester compound.

<12> The resin composition according to above <11>, wherein the naphthol aralkyl-based cyanate ester compound is represented by the following general formula (1), the novolac-based cyanate ester compound is represented by the following general formula (2), and the biphenyl aralkyl-based cyanate ester compound is represented by the following general formula (3):

[Formula 1]

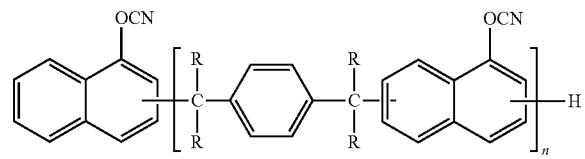

(1)

wherein R each independently represents a hydrogen atom or a methyl group, and n represents an integer of 1 to 50;

[Formula 2]

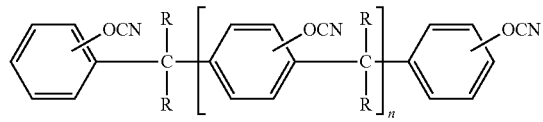

(2)

wherein R each independently represents a hydrogen atom or a methyl group, and n represents an integer of 1 to 50;

[Formula 3]

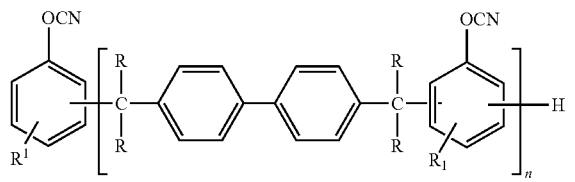

(3)

wherein R each independently represents a hydrogen atom or a methyl group, $R_1$ each independently represents a hydrogen atom, an alkyl group having 2 or less carbon atoms, or an aryl group, and n represents an integer of 1 to 50.

<13> The resin composition according to any one of above <1> to <12>, wherein the cyanate ester compound (A) is comprised in an amount of 10 to 90 parts by mass based on 100 parts by mass of the total of the cyanate ester compound (A) and the epoxy resin (B).

<14> The resin composition according to any one of above <1> to <13>, wherein the epoxy resin (B) is at least one selected from the group consisting of a biphenyl aralkyl-based epoxy resin, a polyoxynaphthylene-based epoxy resin, a triphenolmethane-based epoxy resin, a bisphenol A-based epoxy resin, a bisphenol F-based epoxy resin, a phenol novolac-based epoxy resin, a cresol novolac-based epoxy resin, a bisphenol A novolac-based epoxy resin, a brominated bisphenol A-based epoxy resin, a brominated phenol novolac-based epoxy resin, a biphenyl-based epoxy resin, a phenol aralkyl-based epoxy resin, and a naphthol aralkyl-based epoxy resin.

<15> The resin composition according to any one of above <1> to <14>, further comprising a silane coupling agent (F).

<16> The resin composition according to above <15>, wherein the silane coupling agent (F) is comprised in an amount of 3 to 30 parts by mass based on 100 parts by mass of the total of the cyanate ester compound (A) and the epoxy resin (B).

<17> The resin composition according to any one of above <1> to <16>, further comprising a maleimide compound (G).

<18> The resin composition according to above <17>, wherein the maleimide compound (G) is comprised in an amount of 5 to 75 parts by mass based on 100 parts by mass of a total of the cyanate ester compound (A), the epoxy resin (B), and the maleimide compound (G).

<19> The resin composition according to above <17> or <18>, wherein the maleimide compound (G) is at least one selected from the group consisting of bis(4-maleimidephenyl)methane, 2,2-bis(4-(4-maleimidephenoxy)-phenyl)propane, and bis(3-ethyl-5-methyl-4-maleimidephenyl)methane.

<20> A prepreg obtained by impregnating or coating a substrate with the resin composition according to any one of above <1> to <19>.

<21> A laminate obtained by curing the prepreg according to above <20>.

<22> A metal foil-clad laminate obtained by laminating and curing the prepreg according to above <20> and metal foil.

<23> A printed wiring board comprising an insulating layer and a conductor layer formed on a surface of the insulating layer, wherein
the insulating layer comprises the resin composition according to any one of above <1> to <19>.

Advantageous Effects of Invention

According to the present invention, a resin composition which can simply provide, with good reproducibility, a laminate, a printed wiring board, and the like that not only have excellent heat dissipation properties but have good moldability, good mechanical drillability and excellent appearance. By using the resin composition of the present invention, a printed wiring board, a metal foil-clad laminate, and the like that have excellent heat dissipation properties, moldability, mechanical drillability, and glass transition temperature can be provided. In addition, according to a preferred aspect of the present invention, a resin composition that further has excellent curability in addition to the above-described various performance can be provided. Furthermore, by using the resin composition of the preferred aspect of the present invention, a printed wiring board, a metal foil-clad laminate, and the like that also have excellent peel strength, solder heat resistance, heat resistance property upon moisture absorption, water absorption rate, or the like in addition to the above-described various performance can be implemented.

DESCRIPTION OF EMBODIMENTS

Embodiments of the present invention will be described below. The following embodiments are illustrations for explaining the present invention, and the present invention is not limited only to the embodiments.
A resin composition in the present embodiment contains at least a cyanate ester compound (A), an epoxy resin (B), a first inorganic filler (C), a second inorganic filler (D), and a molybdenum compound (E), wherein the average particle diameter ratio of the first inorganic filler (C) to the second inorganic filler (D) is in the range of 1:0.02 to 1:0.2.

As the cyanate ester compound (A) used in the resin composition in the present embodiment, any generally known compound can be appropriately used. The type of the cyanate ester compound (A) is not particularly limited. Specific examples thereof include naphthol aralkyl-based cyanate ester compounds, novolac-based cyanate esters, biphenyl aralkyl-based cyanate esters, 1,3-dicyanatobenzene, 1,4-dicyanatobenzene, 1,3,5-tricyanatobenzene, bis(3,5-dimethyl 4-cyanatophenyl)methane, 1,3-dicyanatonaphthalene, 1,4-dicyanatonaphthalene, 1,6-dicyanatonaphthalene, 1,8-dicyanatonaphthalene, 2,6-dicyanatonaphthalene, 2,7-dicyanatonaphthalene, 1,3,6-tricyanatonaphthalene, 4,4'-dicyanatobiphenyl, bis(4-cyanatophenyl)methane, bis(4-cyanatophenyl)propane, bis(4-cyanatophenyl)ether, bis(4-cyanatophenyl)thioether, bis(4-cyanatophenyl)sulfone, 2,2'-bis(4-cyanatophenyl) propane, bis(3,5-dimethyl, 4-cyanatophenyl)methane. Among these, in terms of excellent flame retardancy, high curability, and a low thermal expansion coefficient of the cured product, and the like, naphthol aralkyl-based cyanate ester compounds, novolac-based cyanate ester compounds, and biphenyl aralkyl-based cyanate ester compounds are preferred. Particularly, naphthol aralkyl-based cyanate ester compounds represented by the following general formula (1), novolac-based cyanate ester compounds represented by the following general formula (2), and biphenyl aralkyl-based cyanate ester compounds represented by the following general formula (3) are more preferred.

[Formula 4]

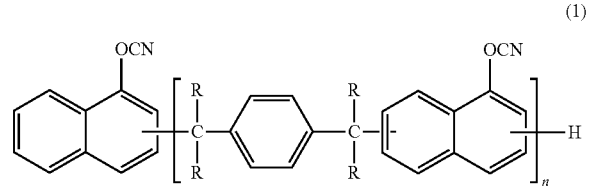

(1)

wherein R each independently represents a hydrogen atom or a methyl group, and n represents an integer of 1 to 50.

[Formula 5]

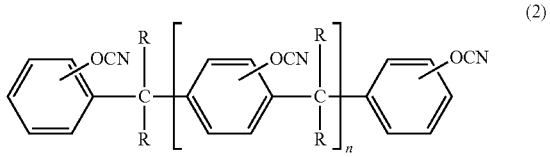

(2)

wherein R each independently represents a hydrogen atom or a methyl group, and n represents an integer of 1 to 50.

[Formula 6]

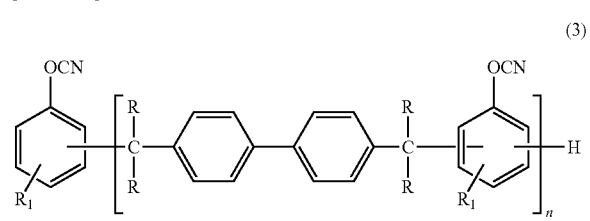

(3)

wherein R each independently represents a hydrogen atom or a methyl group, $R_1$ each independently represents a hydrogen atom, an alkyl group having 2 or less carbon atoms, or an aryl group, and n represents an integer of 1 to 50.

Among the above general formula (1) to (3), α-naphthol aralkyl-based cyanate ester compounds in which the substituent R is hydrogen can be preferably used because they have not only excellent heat resistance but also excellent properties such as water absorbency and heat resistance property upon moisture absorption. In addition, in the above general formula (3), examples of the alkyl group having 2 or less carbon atoms, $R_1$, include a methyl group and an ethyl group, and examples of the aryl group, $R_1$, include a phenyl group and a naphthyl group. One cyanate ester compound can be used alone or two or more cyanate ester compounds can be used in appropriate combination. In addition, as the cyanate ester compounds represented by the above general formulas (1) to (3), two or more cyanate ester compounds (A) in which n in the above general formulas (1) to (3) are different from each other can also be appropriately mixed and used.

The content of the cyanate ester compound (A) in the resin composition in the present embodiment can be appropriately set according to the intended application and performance, and is not particularly limited. In terms of the solvent solubility and curability of the resin composition, and further the heat resistance of a laminate obtained using the resin composition, and the like, the content of the cyanate ester compound (A) is preferably 10 to 90 parts by mass, more preferably 30 to 70 parts by mass, and further preferably 30 to 55 parts by mass, based on 100 parts by mass of the total of the cyanate ester compound (A) and the epoxy resin (B).

For the epoxy resin (B) used in the resin composition in the present embodiment, any known compound can be used provided that it is a compound having two or more epoxy groups in one molecule. The type of the epoxy resin (B) is not particularly limited. Examples thereof include biphenyl aralkyl-based epoxy resins, polyoxynaphthylene-based epoxy resins, triphenolmethane-based epoxy resins, bisphenol A-based epoxy resins, bisphenol E-based epoxy resins, bisphenol F-based epoxy resins, bisphenol S-based epoxy resins, phenol novolac-based epoxy resins, cresol novolac-based epoxy resins, anthracene-based epoxy resins, bisphenol A novolac-based epoxy resins, glycidyl ester-based epoxy resins, aralkyl novolac-based epoxy resins, dicyclopentadiene-based epoxy resins, brominated bisphenol A-based epoxy resins, brominated phenol novolac-based epoxy resins, trifunctional phenol-based epoxy resins, tetrafunctional phenol-based epoxy resins, naphthalene-based epoxy resins, biphenyl-based epoxy resins, phenol aralkyl-based epoxy resins, naphthol aralkyl-based epoxy resins, alicyclic epoxy resins, polyol-based epoxy resins, phosphorus-containing epoxy resins, glycidyl amines, glycidyl esters, compounds obtained by epoxidizing the double bond of butadiene or the like, and compounds obtained by the reaction of hydroxyl group-containing silicone resins with epichlorohydrin. Among these, in terms of excellent heat resistance and excellent properties such as water absorbency and heat resistance property upon moisture absorption, biphenyl aralkyl-based epoxy resins, polyoxynaphthylene-based epoxy resins, triphenolmethane-based epoxy resins, bisphenol A-based epoxy resins, bisphenol F-based epoxy resins, phenol novolac-based epoxy resins, cresol novolac-based epoxy resins, bisphenol A novolac-based epoxy resins, brominated bisphenol A-based epoxy resins, brominated phenol novolac-based epoxy resins, biphenyl-based epoxy resins, phenol aralkyl-based epoxy resins, and naphthol aralkyl-based epoxy resins are preferred. One of these epoxy resins can be used alone or two or more of these epoxy resins can be used in appropriate combination.

The content of the epoxy resin (B) in the resin composition in the present embodiment can be appropriately set according to the intended application and performance, and is not particularly limited. In terms of the heat resistance, thermal conductivity, and water absorbency of the resin composition and the cured product thereof, the content of the epoxy resin (B) is preferably 10 to 90 parts by mass, more preferably 30 to 80 parts by mass, and further preferably 55 to 75 parts by mass, based on 100 parts by mass of the total of the cyanate ester compound (A) and the epoxy resin (B).

The resin composition in the present embodiment contains at least two inorganic fillers having different average particle diameters (D50), that is, the first inorganic filler (C) having a large average particle diameter and the second inorganic filler (D) having a smaller average particle diameter than the first inorganic filler (C).

Here, in the resin composition in the present embodiment, in terms of increasing thermal conductivity, improving the filling rate of the inorganic fillers, and increasing the moldability of the resin composition, it is required that the average particle diameter (D50) ratio of the first inorganic filler (C) to the second inorganic filler (D) is in the range of 1:0.02 to 1:0.2. The reasons are the following: the inorganic filler having a smaller average particle diameter enters the gaps between the particles of the inorganic filler having a larger average particle diameter, and thus, the volume content (hereinafter also simply referred to as "filling rate") of the inorganic fillers in the resin composition can be increased to improve thermal conductivity; and by the roller effect of the small particles, the breakage of a drill bit can be prevented during hole working by a mechanical drill. Here, the average particle diameter ratio of the first inorganic filler (C) to the second inorganic filler (D) is preferably in the range of 1:0.025 to 1:0.18, preferably in the range of 1:0.05 to 1:0.16, in terms of further improving the filling rate.

The average particle diameter herein means a median diameter (D50), and is a diameter at which the larger side and the smaller side are equivalent when the measured particle size distribution of a powder is divided into two. More specifically, the average particle diameter (D50) herein means a value at which 50% of the total volume is reached in volume summation from a small particle when the particle size distribution of a powder dispersed in methyl ethyl ketone is measured by a laser diffraction scattering particle size distribution measuring apparatus under conditions in Examples described later.

The first inorganic filler (C) used in the resin composition in the present embodiment has a larger average particle diameter than the second inorganic filler (D), and increases the thermal conductivity of the cured product. Specific examples thereof include magnesium oxide, boehmite, metal hydrates, such as magnesium hydroxide, zinc stannate, clay, kaolin, talc, fired clay, fired kaolin, fired talc, natural mica, synthetic mica, E-glass, A-glass, NE-glass, C-glass, L-glass, D-glass, S-glass, M-glass G20, glass short fibers (including glass fine powders, such as E-glass, T-glass, D-glass, S-glass, and Q-glass), hollow glass, and spherical glass. Among these, in terms of the thermal conductivity and hardness of the cured product, magnesium oxide and boehmite are preferred for the first inorganic filler (C). As long as the average particle diameter ratio of these to the second inorganic filler (D) being in the range of 1:0.02 to 1:0.2 is satisfied, one of these can be used alone, or two or more of these can be used in appropriate combination.

The average particle diameter (D50) of the first inorganic filler (C) is not particularly limited, but is preferably 0.5 to 10 μm, more preferably 1.5 to 7 μm, further preferably 2 to 5 μm, in terms of dispersibility and filling rate. The shape of the first inorganic filler (C) is not particularly limited, but is preferably spherical in terms of decreasing specific surface area.

The second inorganic filler (D) used in the resin composition in the present embodiment has a smaller average particle diameter than the first inorganic filler (C). Specific examples of the second inorganic filler (D) can be those generally used in insulating resins for printed wiring boards and laminates without particular limitation, and include silicas, such as natural silica, fused silica, synthetic silica, amorphous silica, and hollow silica, alumina, zinc oxide, magnesium oxide, zirconium oxide, aluminum hydroxide, boehmite, boron nitride, aggregated boron nitride, silicon nitride, aluminum nitride, molybdenum compounds, such as molybdenum oxide and zinc molybdate, zinc borate, aluminum nitride, barium sulfate, heat-treated products of aluminum hydroxide (products obtained by heat-treating aluminum hydroxide to decrease part of the water of crystallization), metal hydrates, such as magnesium hydroxide, zinc stannate, clay, kaolin, talc, fired clay, fired kaolin, fired talc, natural mica, synthetic mica, E-glass, A-glass, NE-glass, C-glass, L-glass, D-glass, S-glass, N-glass G20, glass short fibers (including glass fine powders, such as E-glass, T-glass, D-glass, S-glass, and Q-glass), hollow glass, and spherical glass. Among these, in terms of thermal conductivity and filling rate, alumina, magnesium oxide, aluminum hydroxide, boron nitride, aggregated boron nitride, silicon nitride, molybdenum compounds, zinc borate, and aluminum nitride are preferred, and alumina, magnesium oxide, boron nitride, and aluminum nitride are more preferred. As long as the average particle diameter ratio of the first inorganic filler (C) to these being in the range of 1:0.02 to 1:0.2 is satisfied, one of these can be used alone, or two or more of these can be used in appropriate combination.

The average particle diameter (D50) of the second inorganic filler (D) is not particularly limited, but is preferably 0.01 to 2 μm, more preferably 0.1 to 1.0 μm, in terms of dispersibility and filling rate. The shape of the second inorganic filler (D) is not particularly limited, but is preferably spherical in terms of increasing the filling rate.

In the resin composition in the present embodiment, the content of the first inorganic filler (C) and the second inorganic filler (D) can be appropriately set, and is not particularly limited. In terms of the balance between thermal conductivity and moldability, the content of the first inorganic filler (C) and the second inorganic filler (D) is preferably 200 to 800 parts by mass, more preferably 250 to 750 parts by mass, further preferably 300 to 700 parts by mass in total, based on 100 parts by mass of the total of the cyanate ester compound (A) and the epoxy resin (B).

In addition, in terms of thermal conductivity, the volume ratio of the total of the first inorganic filler (C) and the second inorganic filler (D) in the resin composition in the present embodiment is preferably 40% by volume or more and 70% by volume or less based on the total volume of the resin composition.

On the other hand, in the resin composition in the present embodiment, the mass ratio of the first inorganic filler (C) to the second inorganic filler (D) can be appropriately set, and is not particularly limited. In terms of increasing the filling rate, the mass ratio is preferably 1:0.03 to 1:0.5, more preferably 1:0.2 to 1:0.45. At such a content ratio, the gaps between the large particles are sufficiently filled with the small particles, and therefore, there is a tendency that the resin composition is densely filled with the large and small particles each other. In addition, at such a mass ratio, there is a tendency that the flowability of the resin composition is improved, and molding failure, such as voids during press molding, is reduced, and further, there is a tendency that the hole workability by a mechanical drill is improved.

The resin composition in the present embodiment further comprises the molybdenum compound (E). By blending the molybdenum compound (E), there is a tendency that the flame retardancy of a prepreg, a laminate, and the like obtained using the resin composition in the present embodiment is increased, and further, the drillability is improved. The molybdenum compound (E) is not particularly limited as long as it comprises molybdenum in the molecule. Examples thereof include molybdenum compounds, such as zinc molybdate (for example, $ZnMoO_4$ and $Zn_3Mo_2O_9$), ammonium molybdate, sodium molybdate, calcium molybdate, potassium molybdate, molybdenum trioxide, and molybdenum disulfide. One of these can be used alone, or two or more of these can be used in appropriate combination. In terms of not serving as an organometallic catalyst, and in terms of achieving both the above-described drillability and heat resistance, zinc molybdate, ammonium molybdate, and molybdenum trioxide are preferred.

The above-described molybdenum compound (E) may be a surface-treated molybdenum particle in which an inorganic oxide is formed on at least part of the surface of a core particle formed of a molybdenum compound. Specific examples thereof include those obtained by surface-treating particles of a commercially available molybdenum compound using a silane coupling agent, or those obtained by treating their surfaces with an inorganic oxide by a method, such as a sol-gel method or a liquid phase deposition method. The surface-treated molybdenum particles whose surfaces are treated with an inorganic oxide are particularly preferred because the inorganic oxide acts effectively on heat, and the molybdenum compound acts effectively on drilling, and both two conflicting properties, drillability and heat resistance, can be achieved to a high degree.

Here, the inorganic oxide formed on the surface of the molybdenum compound is not particularly limited. Examples thereof include silica, titania, alumina, and silcoxide. In terms of heat resistance, insulation properties, cost, and the like, silica is preferred.

In addition, the thickness of the inorganic oxide formed on the surface of the molybdenum compound is not particularly limited, but is preferably 15 to 50 nm in terms of heat resistance and in terms of being able to decrease cracks that occur when providing the inorganic oxide on the surfaces of the particles of the molybdenum compound.

As the method for fabricating surface-treated molybdenum particles, the following method is convenient. First, particles of a molybdenum compound are dispersed in an alcohol solution in which a metal alkoxide, such as a silicon alkoxide or an aluminum alkoxide, is dissolved, and a mixed solution containing water, an alcohol, and a catalyst is dropped while the dispersion is stirred, to hydrolyze the alkoxide to form a film of silicon oxide, aluminum oxide, or the like on the particle surfaces. Then, the particles are subjected to solid-liquid separation and vacuum drying, followed by heat treatment. By these operations, surface-treated molybdenum particles having a film of an inorganic oxide on the surfaces of particles of a molybdenum compound are conveniently obtained.

The average particle diameter (D50) of the molybdenum compound (E) is not particularly limited, but is preferably 0.1 to 10 μm, more preferably 0.3 to 7 μm, and further preferably 0.5 to 5 μm, in terms of dispersibility and filling rate. The shape of the molybdenum compound (E) is not particularly limited, but is preferably spherical in terms of decreasing specific surface area.

In the resin composition in the present embodiment, the content of the molybdenum compound (E) can be appropriately set, and is not particularly limited. The content of the molybdenum compound (E) is preferably 0.1 to 20 parts by mass, more preferably 1 to 10 parts by mass, and further preferably 1 to 5 parts by mass, based on 100 parts by mass of the total of the cyanate ester compound (A) and the epoxy resin (B).

In addition, in terms of thermal conductivity, the volume ratio of the total of the first inorganic filler (C), the second inorganic filler (D), and the above molybdenum compound (E) in the resin composition in the present embodiment is preferably 40% by volume or more and 70% by volume or less in total based on the total volume of the resin composition.

The resin composition in the present embodiment may further contain a silane coupling agent (F) as required. The silanol group of a silane coupling agent particularly has excellent affinity and reactivity with materials having a hydroxyl group on a surface, and therefore is effective for organic matter-inorganic matter bonds. When the particle surface of an inorganic filler reacts with the silane coupling agent, the adhesiveness between a thermosetting resin and the inorganic filler is increased. Therefore, by using the silane coupling agent (F) in combination, there is a tendency that the peel strength, elastic modulus, and heat resistance property upon moisture absorption of the obtained metal foil-clad laminate, printed wiring board, and the like, and the appearance of the cured product are improved. As the silane coupling agent (F) used here, those generally used for the surface treatment of inorganic matter can be preferably used, and the type of the silane coupling agent (F) is not particularly limited. Specific examples thereof include aminosilane-based silane coupling agents, such as γ-aminopropyltriethoxysilane and N-β-(aminoethyl)-γ-aminopropyltrimethoxysilane, epoxysilane-based silane coupling agents, such as γ-glycidoxypropyltrimethoxysilane, vinylsilane-based silane coupling agents, such as γ-methacryloxypropyltrimethoxysilane, cationic silane-based silane coupling agents, such as N-β-(N-vinylbenzylaminoethyl)-γ-aminopropyltrimethoxysilane hydrochloride, and phenylsilane-based silane coupling agents. One of these can be used alone, or two or more of these can be used in appropriate combination.

The content of the silane coupling agent (F) in the resin composition in the present embodiment can be appropriately set, and is not particularly limited. In terms of the adhesiveness between the resins and the inorganic fillers, and glass transition temperature, the content of the silane coupling agent (F) is preferably 3 to 30 parts by mass based on 100 parts by mass of the total of the cyanate ester compound (A) and the epoxy resin (B).

In addition, the resin composition in the present embodiment may further contain a wetting and dispersing agent as required. By containing a wetting and dispersing agent, there is a tendency that the dispersibility of the inorganic fillers is increased. As the wetting and dispersing agent, those generally used for paints can be preferably used, and the type of the wetting and dispersing agent is not particularly limited. Preferably, copolymer-based wetting and dispersing agents are used. Specific examples thereof include, but are not particularly limited to, polymer wetting and dispersing agents manufactured by BYK Japan KK, for example, BYK-W903, BYK-W940, BYK-W996, BYK-W9010, Disper-BYK110, Disper-BYK111, and Disper-BYK-110, 111, 161, and 180. One wetting and dispersing agent can be used alone, or two or more wetting and dispersing agents can be used in appropriate combination.

The content of the wetting and dispersing agent in the resin composition in the present embodiment can be appropriately set, and is not particularly limited. In terms of increasing dispersibility, the content of the wetting and dispersing agent is preferably 1 to 10 parts by mass, more preferably 5 to 9 parts by mass based on 100 parts by mass of the total of the cyanate ester compound (A) and the epoxy resin (B).

Further, the resin composition in the present embodiment may further contain a maleimide compound (G) as required. By containing the maleimide compound (G), the cyanate ester compound (A) reacts with the maleimide group, and there is a tendency that the crosslinking density is thus increased thereby to improve the heat resistance and elastic modulus of the obtained metal foil-clad laminate, printed wiring board and the like. As the maleimide compound (G), any known compound can be appropriately used provided that it has one or more maleimide groups in one molecule. The type of the maleimide compound (G) is not particularly limited. Specific examples thereof include bis(4-maleimidephenyl)methane, 2,2-bis(4-(4-maleimidephenoxy)-phenyl)propane, bis(3,5-dimethyl-4-maleimidephenyl)methane, bis(3-ethyl-5-methyl-4-maleimidephenyl)methane, bis(3,5-diethyl-4-maleimidephenyl)methane, and tris(4-maleimidephenyl)methane. One of these maleimide compounds can be used alone, or two or more of these maleimide compounds can be used in appropriate combination. The maleimide compound (G) is not limited to those in the form of a monomer, and may be in the form of a prepolymer. It may be also in the form of a prepolymer of a bismaleimide compound and an amine compound or the like. Among these, in terms of heat resistance, bis(4-maleimidephenyl)methane, 2,2-bis(4-(4-maleimidephenoxy)-phenyl)propane, and bis(3-ethyl-5-methyl-4-maleimidephenyl)methane are preferred.

The content of the maleimide compound (G) in the resin composition in the present embodiment can be appropriately set, and is not particularly limited. In terms of heat resistance and elastic modulus, the content of the maleimide compound (G) is preferably 5 to 75 parts by mass, more preferably 10 to 70 parts by mass, further preferably 12 to 40 parts by mass, based on 100 parts by mass of the total of the cyanate ester compound (A), the epoxy resin (B), and the maleimide compound (G).

Further, the resin composition in the present embodiment may contain a curing accelerator for appropriately adjusting curing speed, as required. As the curing accelerator, one generally used as a curing accelerator for the cyanate ester compound (A) and the epoxy resin (B) can be preferably used, and the type of the curing accelerator is not particularly limited. Examples thereof include organometallic salts of copper, zinc, cobalt, nickel, manganese, and the like, imidazoles and derivatives thereof, and tertiary amines. One curing accelerator can be used alone, or two or more curing accelerators can be used in appropriate combination. The content of the curing accelerator can be appropriately adjusted in terms of the degree of cure of the resins, the viscosity of the resin composition, and the like, and is not particularly limited. The content of the curing accelerator is usually about 0.01 to 15 parts by mass based on 100 parts by mass of the total of the above-described (A), (B), and (F) components, preferably about 0.02 to 3 parts by mass.

The resin composition in the present embodiment may comprise components other than the above-described components, if needed, as long as the desired properties are not impaired. Examples of such optional blending materials include various polymer compounds, such as thermosetting resins, thermoplastic resins, and oligomers and elastomers thereof, a flame-retardant compound, and various additives, other than the above. These can be used without particular limitation as long as they are those generally used. Examples of the flame-retardant compound include bromine compounds, such as 4,4'-dibromobiphenyl, phosphorus compounds, such as phosphate esters, melamine phosphate, and phosphorus-containing epoxy resins, nitrogen-containing compounds, such as melamine and benzoguanamine, oxazine ring-containing compounds, and silicone-based compounds. One flame-retardant compound can be used alone, or two or more flame-retardant compounds can be used in appropriate combination. The various additives include an ultraviolet absorbing agent, an antioxidant, a photopolymerization initiator, a fluorescent brightening agent, a photosensitizer, a dye, a pigment, a thickening agent, a lubricant, a defoaming agent, a dispersing agent, a leveling agent, a brightening agent, and a polymerization inhibitor. One of these optional additives can be used alone, or two or more of these optional additives can be used in appropriate combination.

The resin composition in the present embodiment may comprise an organic solvent as required. In other words, the resin composition in the present embodiment can be used as a form (of resin varnish) in which at least part, preferably all, of the above-described cyanate ester compound (A) and epoxy resin (B) and further the maleimide compound (G) comprised as required are dissolved in or compatible with an organic solvent. Since the viscosity of the resin composition is decreased by containing the organic solvent, there is a tendency that the handling properties are improved, and that the impregnation properties for glass cloth are increased. The type of the organic solvent is not particularly limited as long as it is capable of dissolving or being compatible with a mixture of the cyanate ester compound (A) and the epoxy resin (B) and further the maleimide compound (G) comprised as required. Examples thereof include ketones, such as acetone, methyl ethyl ketone, methyl isobutyl ketone, and cyclohexanone, aromatic hydrocarbons, such as benzene, toluene, and xylene, and amides, such as dimethylformamide and dimethylacetamide. One of these organic solvents can be used alone, or two or more of these organic solvents can be used in appropriate combination.

The resin composition in the present embodiment can be prepared by stirring and mixing the above-described cyanate ester compound (A), epoxy resin (B), first inorganic filler (C), second inorganic filler (D), and molybdenum compound (E) according to an ordinary method. The method for preparing the resin composition in the present embodiment is not particularly limited. Examples thereof include a method including blending the first inorganic filler (C), the second inorganic filler (D), and the molybdenum compound (E) with the epoxy resin (B), dispersing them by a homomixer or the like, and blending the cyanate ester compound (A) therewith. During the preparation of the resin composition, it is desired to add an organic solvent in order to decrease viscosity to improve handling properties and increase impregnation properties for glass cloth.

A prepreg in the present embodiment is obtained by impregnating or coating a substrate with the above resin composition in the present embodiment. The substrate used in the prepreg in the present embodiment is not particularly limited, and can be appropriately selected and used from among, for example, known ones used for various printed wiring board materials, depending on the intended application and performance. Specific examples thereof include woven fabrics of glass fibers, such as E-glass, T-glass, L-glass, D-glass, S-glass, NE-glass, Q-glass, UN-glass, and spherical glass, inorganic fibers other than glass, such as quartz, organic fibers, such as polyimides, polyamides, and polyesters, and liquid crystal polyesters. One of these can be used alone, or two or more of these can be used in appropriate combination.

As the shape of the substrate, woven fabrics, nonwoven fabrics, rovings, chopped strand mats, surfacing mats, and the like are known, and as the weave of the woven fabric, plain weave, basket weave, twill weave, and the like are known. Any may be used. In addition, the thickness of the substrate is not particularly limited, but is usually about 0.01 to 0.3 mm, and is, for example, preferably in the range of 0.01 to 0.2 mm in laminate applications. Among these substrates, particularly, glass fibers of E-glass are preferably used in laminate applications because of the balance between the expansion coefficient in the planar direction and workability.

The above-described substrate may be surface-treated in terms of adhesiveness to the resin and heat resistance property upon moisture absorption. For example, the surface of the substrate can be surface-treated with a silane coupling agent or the like. In addition, when a woven fabric is used as the substrate, the woven fabric is preferably a physically opened one in terms of adhesiveness to the resin. Further, when a film is used as the substrate, a film surface-treated by plasma or the like is preferred in terms of adhesiveness to the resin.

The prepreg in the present embodiment can be fabricated according to an ordinary method, and the method for fabricating the prepreg is not particularly limited. As the method for fabricating a prepreg, a method including impregnating or coating a substrate with the above resin composition is generally known. More specifically, for example, the prepreg in the present embodiment can be fabricated by impregnating or coating a substrate with a resin varnish obtained by adding an organic solvent to the above resin composition, and then heating the substrate with the resin varnish in a dryer at 100 to 200° C. for 1 to 60 minutes, or the like for semi-curing (B-staging). At this time, the amount of the resin composition adhered to the substrate, that is, the amount of the resin composition (including the first inorganic filler (C), the second inorganic filler (D), and the molybdenum compound (E)) based on the total amount of the prepreg after the semi-curing, is preferably in the range of 40 to 95% by mass.

A laminate in the present embodiment is obtained by lamination and molding using the above-described prepreg. In addition, a metal foil-clad laminate in the present embodiment is obtained by laminating and molding the above-described prepreg and metal foil. Specifically, the metal foil-clad laminate in the present embodiment can be fabricated by stacking one or a plurality of the above-described prepregs, disposing metal foil, such as copper or aluminum, on one surface or both surfaces of the stack as desired, and laminating them. The metal foil used here is not particularly limited as long as it is one used for a printed wiring board material. Generally, copper foil, such as rolled copper foil and electrolytic copper foil, is preferred. Considering conductor loss in the high frequency region, electrolytic copper foil having small matte surface roughness is more preferred. In addition, the thickness of the metal foil is not particularly limited, but is preferably 2 to 70 μm, more preferably 2 to 35 μm. As the molding conditions, usual methods for laminates and multilayer boards for printed wiring boards can be applied. For example, molding is generally performed at a temperature in the range of 100 to 300° C. and a surface pressure in the range of 2 to 100 kgf/cm$^2$ with a heating time in the range of 0.05 to 5 hours using a multistage press, a multistage vacuum press, a continuous molding machine, an autoclave molding machine, or the like. In addition, a multilayer board can also be provided by laminating and molding the above prepreg and a separately fabricated wiring board for an inner layer in combination.

The above metal foil-clad laminate in the present embodiment can be preferably used as a printed wiring board by forming a predetermined wiring pattern. The metal foil-clad laminate in the present embodiment has good moldability, good mechanical drillability and excellent appearance, and moreover can have high performance also in peel strength, solder heat resistance, heat resistance property upon moisture absorption, water absorption rate, or the like, and therefore can be especially effectively used as a printed wiring board material addressing higher integration and higher density for which such performance is required.

The metal foil-clad laminate in the present embodiment can be preferably used as a printed wiring board. The printed wiring board can be manufactured according to an ordinary method, and the method for manufacturing the printed wiring board is not particularly limited. One example of a method for manufacturing a printed wiring board will be shown below. First, a metal foil-clad laminate, such as the above-described copper-clad laminate, is prepared. Next, a surface of the metal foil-clad laminate is subjected to etching treatment to form an inner layer circuit to fabricate an inner layer board. The inner layer circuit surface of this inner layer board is subjected to surface treatment for increasing adhesive strength, as required. Then, the required number of the above-described prepregs are stacked on the inner layer circuit surface, metal foil for an outer layer circuit is further laminated on the outside of the stack, and the laminate is heated and pressurized for integral molding. In this manner, a multilayer laminate in which an insulating layer comprising a substrate and a cured product of a thermosetting resin composition is formed between an inner layer circuit and metal foil for an outer layer circuit is manufactured. Then, this multilayer laminate is subjected to perforation for through holes and via holes, and then, a plated metal film that allows conduction between the inner layer circuit and the metal foil for an outer layer circuit is formed on the wall surface of this hole. Further, the metal foil for an outer layer circuit is subjected to etching treatment to form an outer layer circuit, and a printed wiring board is manufactured.

The printed wiring board obtained in the above manufacturing example has a configuration in which it has an insulating layer and a conductor layer formed on a surface of this insulating layer, and the insulating layer comprises the resin composition in the present embodiment described above. In other words, the prepreg in the present embodiment described above (the substrate and the resin composition in the present embodiment with which the substrate is impregnated or coated), and the resin composition layer of the metal foil-clad laminate in the present embodiment described above (the layer comprising the resin composition in the present embodiment) are composed of an insulating layer comprising the resin composition in the present embodiment.

EXAMPLES

The present invention will be described more specifically below by giving Examples and Comparative Examples, but the present invention is not limited to these. "Parts" indicates "parts by mass" unless otherwise specified below.

Synthesis Example 1

0.47 moles (in terms of OH groups) of an α-naphthol aralkyl resin (SN495V, OH group equivalent: 236 g/eq., manufactured by Nippon Steel Chemical Co., Ltd.: including those in which the number of repeating units n of naphthol aralkyl was 1 to 5) was dissolved in 500 ml of chloroform in a reactor, and 0.7 moles of triethylamine was added to this solution. While the temperature was maintained at −10° C., 300 g of a chloroform solution of 0.93 moles of cyanogen chloride was dropped into the reactor over 1.5 hours. After the completion of the dropping, the mixture was stirred for 30 minutes. Then, a mixed solution of 0.1 moles of triethylamine and 30 g of chloroform was further dropped into the reactor, and the mixture was stirred for 30 minutes to complete the reaction. Hydrochloride of triethylamine produced as a by-product was filtered off from the reaction liquid. Then, the obtained filtrate was washed with 500 ml of 0.1 N hydrochloric acid, and then repeatedly washed with 500 ml of water four times. This was dried with sodium sulfate, followed by evaporation at 75° C. and further reduced pressure degassing at 90° C. to obtain a brown solid α-naphthol aralkyl-based cyanate ester compound represented by the above general formula (1), wherein all R was a hydrogen atom. The obtained α-naphthol aralkyl-based cyanate ester compound was analyzed by an infrared absorption spectrum. The absorption of the cyanate ester group around 2264 $cm^{-1}$ was confirmed.

Example 1

Forty parts by mass of the α-naphthol aralkyl-based cyanate ester compound obtained in Synthesis Example 1, 20 parts by mass of bis(3-ethyl-5-methyl-4-maleimidephenyl)methane (BMI-70, manufactured by K.I Chemical Industry Co., Ltd.), 40 parts by mass of a biphenyl aralkyl-based epoxy resin (NC-3000-FH, manufactured by Nippon Kayaku Co., Ltd.), 5 parts by mass of a silane coupling agent (Z6040, manufactured by Dow Corning Toray Co., Ltd.), and 5 parts by mass of a wetting and dispersing agent comprising an acid group (BYK-W903, manufactured by BYK Japan KK) were dissolved and mixed in methyl ethyl ketone, and 240 parts by mass of boehmite having an average particle diameter of 3 μm (BMT33W, manufactured by KAWAI LIME INDUSTRY CO., LTD.), 60 parts by mass of spherical alumina having an average particle diameter of 0.3 μm (ASFP-20, manufactured by DENKI KAGAKU KOGYO KABUSHIKI KAISHA), 3 parts by mass of zinc molybdate (manufactured by NIPPON INORGANIC COLOUR & CHEMICAL CO., LTD.), 0.01 parts by mass of NIKKA OCTHIX manganese (Mn 8%) (manufactured by The Nippon Synthetic Chemical Industry Co., Ltd.), and 0.5 parts by mass of 2,4,5-triphenylimidazole (manufactured by TOKYO CHEMICAL INDUSTRY CO., LTD.) were mixed into the solution to obtain a resin varnish. The average particle diameter (D50) is a value obtained by dispersing each inorganic filler in methyl ethyl ketone, then subjecting the dispersion to dispersion treatment by an ultrasonic homogenizer for 3 minutes, and then measuring using a laser diffraction scattering particle size distribution measuring apparatus (manufactured by SHIMADZU CORPORATION). The obtained resin varnish was further diluted with methyl ethyl ketone, and an E-glass cloth having a mass of 47.2 $g/m^2$ (manufactured by Asahi Kasei E-materials Corp.) was impregnated and coated with the diluted resin varnish, and heated and dried at 160° C. for 3 minutes to obtain a 0.1 mmmt prepreg having a resin content of 84% by mass. Next, two of the obtained prepregs were stacked, and 12 μm thick electrolytic copper foil (3EC-III, manufactured by Mitsui Mining & Smelting Co., Ltd.) was disposed on the upper and lower surfaces of the obtained laminate. The laminate with the electrolytic copper foil was subjected to vacuum pressing at a pressure of 30 $kgf/cm^2$ and a temperature of 220° C. for 120 minutes for lamination and molding to fabricate a metal foil-clad laminate (both surface copper-clad laminate) having a thickness of 0.2 mm. In addition, operation was similarly performed except that eight of the obtained prepregs were stacked, to fabricate a metal foil-clad laminate (both surface copper-clad laminate) having a thickness of 0.8 mm.

Using the obtained metal foil-clad laminates, appearance evaluation, the measurement of thermal conductivity and glass transition temperature, and the evaluation of drill bit life and hole position precision were performed.

(Measurement Methods and Evaluation Methods)

1) Appearance evaluation: The metal foil-clad laminate having a thickness of 0.2 mm was cut to a size of 330 mm×330 mm, and then, all the copper foil on both surfaces was removed by etching to obtain a sample (laminate) in which all the copper foil on the surfaces was removed. This laminate was visually observed, and one in which no voids occurred was evaluated as "◯", and one in which voids occurred was evaluated as "X".

2) Thermal conductivity: The density of the metal foil-clad laminate having a thickness of 0.8 mm was measured, the specific heat was also measured by a DSC (TA Instruments model Q100), and the thermal diffusivity was further measured by a xenon flash analyzer (Bruker: LFA447 Nanoflash). Then, the thermal conductivity was calculated from the following formula.

thermal conductivity (W/m·K)=density ($kg/m^3$)×specific heat (kJ/kg·K)×thermal diffusivity ($m^2$/S)×1000

3) Glass transition temperature (Tg): The glass transition temperature was measured according to JIS C6481 using a dynamic viscoelasticity analyzer (manufactured by TA Instruments) and using a sample obtained by cutting the metal foil-clad laminate having a thickness of 0.8 mm to a size of 40 mm×20 mm by a dicing saw.

4) Drill bit life (Number of drill bit broken holes): After 5000-hit working under the following drill hole working conditions, the back surface of the lowest plate of three stacked metal foil-clad laminates was measured by a hole analyzer (manufactured by Hitachi Via Mechanics, Ltd.), and the statistical number of holes was counted (The numerical value shown in Table 1 is the average value for two workings (n=2).).

Working machine; Hitachi Via Mechanics, Ltd. ND-1 V212

Target sample; a stack of three metal foil-clad laminates having a thickness of 0.2 mm Entry sheet; LE900 manufactured by MITSUBISHI GAS CHEMICAL COMPANY, INC.

Backup board; SPB-W manufactured by NIHON DECOLUXE CO., LTD.

Drill bit; KMC L518A 0.105×1.8, manufactured by UNION TOOL CO.

5) Hole position precision: After 5000-hit working under the same drill hole working conditions as the above 4), the distance of positional displacement between hole positions on the back surface of the lowest plate of a laminate obtained by stacking three metal foil-clad laminates having a thickness of 0.2 mm and designated coordinates was measured by a hole analyzer (manufactured by Hitachi Via Mechanics, Ltd.). Here, the distance of positional displacement was measured for the all worked holes per drill, its average value and standard deviation (o) were calculated, and the average value of the distance of positional displacement+3σ was calculated (The numerical value shown in Table 1 is the average value for two workings (n=2).).

Example 2

Operation was performed as in Example 1 except that the amount of the α-naphthol aralkyl-based cyanate ester compound blended was changed to 30 parts by mass, 30 parts by mass of a maleimide compound (BMI-2300, manufactured by Daiwa Kasei Co., Ltd.) was used instead of the bis(3-ethyl-5-methyl-4-maleimidephenyl)methane, and 40 parts by mass of a polyoxynaphthylene-based epoxy resin (HP6000, manufactured by DIC) was used instead of the biphenyl aralkyl-based epoxy resin. The various physical property values of the obtained metal foil-clad laminates are shown in Table 1.

Example 3

Operation was performed as in Example 2 except that 280 parts by mass of boehmite having an average particle diameter of 3 μm (BM5009, manufactured by Admatechs Company Limited) was used instead of the boehmite having an average particle diameter of 3 μm (BMT33W, manufactured by KAWAI LIME INDUSTRY CO., LTD.), and the amount of the spherical alumina having an average particle diameter of 0.3 μm blended was changed to 70 parts by mass, and the amount of the silane coupling agent blended was changed to 10 parts by mass. The various physical property values of the obtained metal foil-clad laminates are shown in Table 1.

Example 4

Operation was performed as in Example 3 except that 40 parts by mass of the biphenyl aralkyl-based epoxy resin used in Example 1 was used instead of the polyoxynaphthylene-based epoxy resin. The various physical property values of the obtained metal foil-clad laminates are shown in Table 1.

Example 5

Operation was performed as in Example 3 except that the amount of the maleimide compound (BMI-2300) blended was changed to 15 parts by mass, the amount of the polyoxynaphthylene-based epoxy resin blended was changed to 20 parts by mass, the amount of the zinc molybdate blended was changed to 1 part by mass, and the amount of the silane coupling agent blended was changed to 15 parts by mass, and 15 parts by mass of the bis(3-ethyl-5-methyl-4-maleimidephenyl)methane used in Example 1, and 20 parts by mass of the biphenyl aralkyl-based epoxy resin used in Example 1 were blended. The various physical property values of the obtained metal foil-clad laminates are shown in Table 1.

Example 6

Operation was performed as in Example 4 except that the amount of the α-naphthol aralkyl-based cyanate ester compound blended was changed to 25 parts by mass, the amount of the maleimide compound (BMI-2300) blended was changed to 25 parts by mass, and the amount of the zinc molybdate blended was changed to 2 parts by mass, and 10 parts by mass of a triphenolmethane-based epoxy resin (EPPN-501H, manufactured by Nippon Kayaku Co., Ltd.) was blended. The various physical property values of the obtained metal foil-clad laminates are shown in Table 1.

Example 7

Operation was performed as in Example 5 except that 320 parts by mass of boehmite having an average particle diameter of 2.1 μm (MM010, manufactured by KAWAI LIME INDUSTRY CO., LTD.) was used instead of the boehmite having an average particle diameter of 3 μm (BM5009, manufactured by Admatechs Company Limited), and the amount of the spherical alumina having an average particle diameter of 0.3 μm blended was changed to 80 parts by mass, the amount of the silane coupling agent blended was changed to 20 parts by mass, the amount of the biphenyl aralkyl-based epoxy resin blended was changed to 15 parts by mass, and 5 parts by mass of a triphenolmethane-based epoxy resin (EPPN-501H, manufactured by Nippon Kayaku Co., Ltd.) was blended. The various physical property values of the obtained metal foil-clad laminates are shown in Table 2.

Example 8

Operation was performed as in Example 7 except that boehmite having an average particle diameter of 2.8 μm (MM011, manufactured by KAWAI LIME INDUSTRY CO., LTD.) was used instead of the boehmite having an average particle diameter of 2.1 μm (MM010, manufactured by KAWAI LIME INDUSTRY CO., LTD.). The various physical property values of the obtained metal foil-clad laminates are shown in Table 2.

Example 9

Operation was performed as in Example 7 except that 280 parts by mass of boehmite having an average particle diameter of 2.8 μm (MM011, manufactured by KAWAI LIME INDUSTRY CO., LTD.) was used instead of the boehmite having an average particle diameter of 2.1 μm (MM010, manufactured by KAWAI LIME INDUSTRY CO., LTD.), and the amount of the spherical alumina having an average particle diameter of 0.3 μm blended was changed to 120 parts by mass. The various physical property values of the obtained metal foil-clad laminates are shown in Table 2.

Example 10

Operation was performed as in Example 7 except that boehmite having an average particle diameter of 3.4 μm (MM012, manufactured by KAWAI LIME INDUSTRY CO., LTD.) was used instead of the boehmite having an average particle diameter of 2.1 μm (MM010, manufactured by KAWAI LIME INDUSTRY CO., LTD.), a naphthalene-based epoxy resin (EXA4700, manufactured by DIC) was used instead of the triphenolmethane-based epoxy resin (EPPN-501H, manufactured by Nippon Kayaku Co., Ltd.), the amount of the maleimide compound (BMI-2300, manufactured by Daiwa Kasei Co., Ltd.) blended was changed to 20 parts by mass, and the amount of the bis(3-ethyl-5-methyl-4-maleimidephenyl)methane (BMI-70, manufactured by K.I Chemical Industry Co., Ltd.) blended was changed to 10 parts by mass. The various physical property values of the obtained metal foil-clad laminates are shown in Table 2.

Comparative Example 1

Operation was performed as in Example 1 except that the blending of the spherical alumina having an average particle diameter of 0.3 μm was omitted, and the amount of the boehmite having an average particle diameter of 3 μm (BMT33W, manufactured by KAWAI LIME INDUSTRY CO., LTD.) blended was changed to 300 parts by mass. However, voids occurred, and the plate appearance was poor, thereby not leading to property evaluation.

Comparative Example 2

Operation was performed as in Example 1 except that the blending of the spherical alumina having an average particle diameter of 0.3 μm was omitted, and 300 parts by mass of boehmite having an average particle diameter of 3 μm (BM5009, manufactured by Admatechs Company Limited) was used instead of the boehmite having an average particle diameter of 3 μm (BMT33W, manufactured by KAWAI LIME INDUSTRY CO., LTD.). The various physical property values of the obtained metal foil-clad laminates are shown in Table 3.

Comparative Example 3

Operation was performed as in Example 1 except that 490 parts by mass of 3 μm spherical alumina (AX3-15, manufactured by Nippon Steel Materials Co., Ltd. Micron Co.) was used instead of the alumina having an average particle diameter of 0.3 μm, the amount of the NIKKA OCTHIX manganese (Mn 8%) blended was changed to 0.05 parts by mass, the amount of the 2,4,5-triphenylimidazole blended was changed to 1 part by mass, and the blending of the zinc molybdate was omitted. The various physical property values of the obtained metal foil-clad laminates are shown in Table 3.

TABLE 1

| | | Example 1 | Example 2 | Example 3 | Example 4 | Example 5 | Example 6 |
|---|---|---|---|---|---|---|---|
| Evaluation items | Appearance | ◯ | ◯ | ◯ | ◯ | ◯ | ◯ |
| | Thermal conductivity xy-axis [W/m · K] | 1.2 | 1.2 | 1.5 | 1.7 | 1.6 | 1.5 |
| | Glass transition temperature [° C.] | 254 | 284 | 286 | 283 | 281 | 270 |
| | Hole workability drill bit life | 5000< | 5000< | 5000< | 5000< | 5000< | 5000< |
| | Hole position precision (ave. of distance of displacement + 3σ) [um] | 36 | 40 | 27 | 22 | 25 | 23 |

TABLE 2

| | | Example 7 | Example 8 | Example 9 | Example 10 |
|---|---|---|---|---|---|
| Evaluation items | Appearance | ◯ | ◯ | ◯ | ◯ |
| | Thermal conductivity xy-axis [W/m · K] | 1.8 | 1.9 | 1.7 | 2.0 |
| | Glass transition temperature [° C.] | 283 | 284 | 287 | 286 |
| | Hole workability drill bit life | 5000< | 5000< | 5000< | 5000< |
| | Hole position precision (ave. of distance of displacement + 3α) [um] | 26 | 24 | 30 | 27 |

TABLE 3

| | | Comparative Example 1 | Comparative Example 2 | Comparative Example 3 |
|---|---|---|---|---|
| Evaluation items | Appearance | X | ◯ | ◯ |
| | Thermal conductivity xy-axis [W/m · K] | — | 1.1 | 1.7 |
| | Glass transition temperature [° C.] | — | 238 | 251 |
| | Hole workability drill bit life | — | 1600 | 100 |
| | Hole position precision (ave. of distance of displacement + 3α) [um] | — | 41 | — |

This application claims priority from Japanese Patent Application No. 2012-080722 filed with the Japan Patent Office on Mar. 30, 2012, the content of which is incorporated herein by reference.

INDUSTRIAL APPLICABILITY

As described above, the resin composition of the present invention can be widely and effectively utilized in various applications, such as electrical and electronic materials, machine tool materials, and aviation materials, for example, as electrical insulating materials, semiconductor plastic packages, sealing materials, adhesives, lamination materials, resists, and buildup laminate materials, and, particularly, can be especially effectively utilized as printed wiring board materials addressing higher integration and higher density, for information terminal equipment, communication equipment, and the like in recent years. In addition, the laminate, metal foil-clad laminate, and the like of the present invention not only have excellent heat dissipation properties but have good moldability, good mechanical drillability and excellent appearance, and therefore, their industrial practicality is extremely high.

The invention claimed is:

1. A resin composition comprising a cyanate ester compound (A), an epoxy resin (B), a first inorganic filler (C), a second inorganic filler (D), and a molybdenum compound (E), wherein an average particle diameter ratio of the first inorganic filler (C) to the second inorganic filler (D) is in a range of 1:0.02 to 1:0.2, and wherein the molybdenum compound (E) forms a core particle, and an inorganic oxide is formed on at least part of a surface of the core particle.

2. The resin composition according to claim 1, wherein a mass ratio of the first inorganic filler (C) to the second inorganic filler (D) is in a range of 1:0.03 to 1:0.5.

3. The resin composition according to claim 1, wherein the first inorganic filler (C) and the second inorganic filler (D) are comprised in an amount of 200 to 800 parts by mass in total based on 100 parts by mass of a total of the cyanate ester compound (A) and the epoxy resin (B).

4. The resin composition according to claim 1, wherein the molybdenum compound (E) is comprised in an amount of 0.1 to 20 parts by mass based on 100 parts by mass of the total of the cyanate ester compound (A) and the epoxy resin (B).

5. The resin composition according to claim 1, wherein the first inorganic filler (C) is magnesium oxide and/or boehmite.

6. The resin composition according to claim 1, wherein the first inorganic filler (C) has an average particle diameter of 0.5 to 10 μm.

7. The resin composition according to claim 1, wherein the second inorganic filler (D) is at least one selected from the group consisting of alumina, magnesium oxide, boron nitride, and aluminum nitride.

8. The resin composition according to claim 1, wherein the second inorganic filler (D) is spherical.

9. The resin composition according to claim 1, wherein the first inorganic filler (C), the second inorganic filler (D), and the molybdenum compound (E) are comprised in an amount of 40 to 70% by volume in total based on a total volume of the resin composition.

10. The resin composition according to claim 1, wherein the cyanate ester compound (A) is at least one selected from the group consisting of a naphthol aralkyl-based cyanate ester compound, a novolac-based cyanate ester compound, and a biphenyl aralkyl-based cyanate ester compound.

11. The resin composition according to claim 10, wherein the naphthol aralkyl-based cyanate ester compound is represented by the following general formula (1), the novolac-based cyanate ester compound is represented by the following general formula (2), and the biphenyl aralkyl-based cyanate ester compound is represented by the following general formula (3):

[Formula 1]

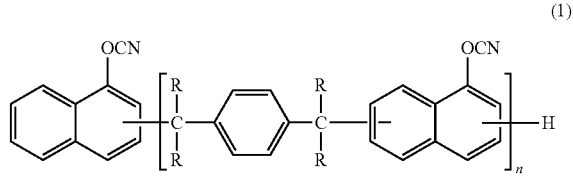

wherein R each independently represents a hydrogen atom or a methyl group, and n represents an integer of 1 to 50;

[Formula 2]

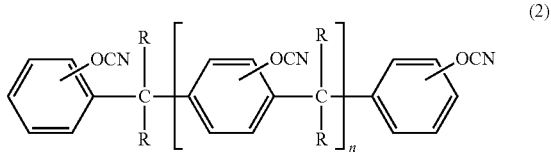

wherein R each independently represents a hydrogen atom or a methyl group, and n represents an integer of 1 to 50;

[Formula 3]

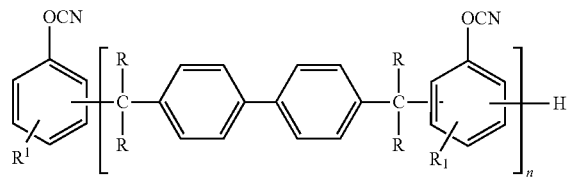

wherein R each independently represents a hydrogen atom or a methyl group, $R_1$ each independently represents a hydrogen atom, an alkyl group having 2 or less carbon atoms, or an aryl group, and n represents an integer of 1 to 50.

12. The resin composition according to claim 1, wherein the cyanate ester compound (A) is comprised in an amount of 10 to 90 parts by mass based on 100 parts by mass of the total of the cyanate ester compound (A) and the epoxy resin (B).

13. The resin composition according to claim 1, wherein the epoxy resin (B) is at least one selected from the group consisting of a biphenyl aralkyl-based epoxy resin, a polyoxynaphthylene-based epoxy resin, a triphenolmethane-based epoxy resin, a bisphenol A-based epoxy resin, a bisphenol F-based epoxy resin, a phenol novolac-based epoxy resin, a cresol novolac-based epoxy resin, a bisphenol A novolac-based epoxy resin, a brominated bisphenol A-based epoxy resin, a brominated phenol novolac-based epoxy resin, a biphenyl-based epoxy resin, a phenol aralkyl-based epoxy resin, and a naphthol aralkyl-based epoxy resin.

14. The resin composition according to claim 1, further comprising a silane coupling agent (F).

15. The resin composition according to claim 14, wherein the silane coupling agent (F) is comprised in an amount of 3 to 30 parts by mass based on 100 parts by mass of the total of the cyanate ester compound (A) and the epoxy resin (B).

16. The resin composition according to claim 1, further comprising a maleimide compound (G).

17. The resin composition according to claim 16, wherein the maleimide compound (G) is comprised in an amount of 5 to 75 parts by mass based on 100 parts by mass of a total of the cyanate ester compound (A), the epoxy resin (B), and the maleimide compound (G).

18. The resin composition according to claim 16, wherein the maleimide compound (G) is at least one selected from the group consisting of bis(4-maleimidephenyl)methane, 2,2-bis(4-(4-maleimidephenoxy)-phenyl)propane, and bis(3-ethyl-5-methyl-4-maleimidephenyl)methane.

19. A prepreg obtained by impregnating or coating a substrate with the resin composition according to claim 1.

20. A laminate obtained by curing the prepreg according to claim 19.

21. A metal foil-clad laminate obtained by laminating and curing the prepreg according to claim 19 and metal foil.

22. A printed wiring board comprising an insulating layer and a conductor layer formed on a surface of the insulating layer, wherein
the insulating layer comprises the resin composition according to claim 1.

* * * * *